United States Patent [19]

Bednar

[11] Patent Number: 5,788,116
[45] Date of Patent: Aug. 4, 1998

[54] ADJUSTABLE TRAY DISPENSER

[75] Inventor: Josef Bednar, Manorville, N.Y.

[73] Assignee: FMV Machine Works, Inc., Ronkonkoma, N.Y.

[21] Appl. No.: 643,794

[22] Filed: May 7, 1996

[51] Int. Cl.$^6$ ............................................. B65G 59/00
[52] U.S. Cl. .......................... 221/222; 221/241; 221/242; 221/297; 414/797.7
[58] Field of Search ................................. 221/221, 222, 221/223, 241, 242, 297; 414/797.7, 798.1, 900

[56] References Cited

U.S. PATENT DOCUMENTS

| | | | |
|---|---|---|---|
| 1,907,713 | 5/1933 | Benson | 221/223 |
| 3,032,237 | 5/1962 | Erickson | 221/223 |
| 3,071,292 | 1/1963 | Atwood et al. | |
| 3,426,941 | 2/1969 | Hovekamp | |
| 4,260,311 | 4/1981 | Hanses | 221/242 |
| 4,441,630 | 4/1984 | Sauer | |
| 4,666,060 | 5/1987 | Bouldin | |
| 4,950,120 | 8/1990 | Barne | 221/297 |
| 5,064,093 | 11/1991 | Davis et al. | 221/222 |

FOREIGN PATENT DOCUMENTS

| 2068916 | 8/1981 | United Kingdom | 414/797.7 |
|---|---|---|---|

*Primary Examiner*—H. Grant Skaggs
*Attorney, Agent, or Firm*—Collard & Roe, P.C.

[57] ABSTRACT

The invention provides an adjustable tray dispenser having a plurality of tray guides for individually dispensing trays from a tray stock. Each of the tray guides is driven by a flexible drive shaft coupled to a gear box. The flexible drive shafts enable the independent adjustment of each tray guide with respect to each other, the dispenser, and the tray stock. A motor coupled to the gear box provides variable speed rotational motion to the flexible drive shafts. Each of the tray guides has a dispensing head that includes a timing adjustment mechanism. The timing adjustment mechanism enables the synchronization of all of the dispensing heads prior to tray dispensing. The independent adjustment ability of the tray guides enables use of the system with any size or shape tray.

8 Claims, 6 Drawing Sheets

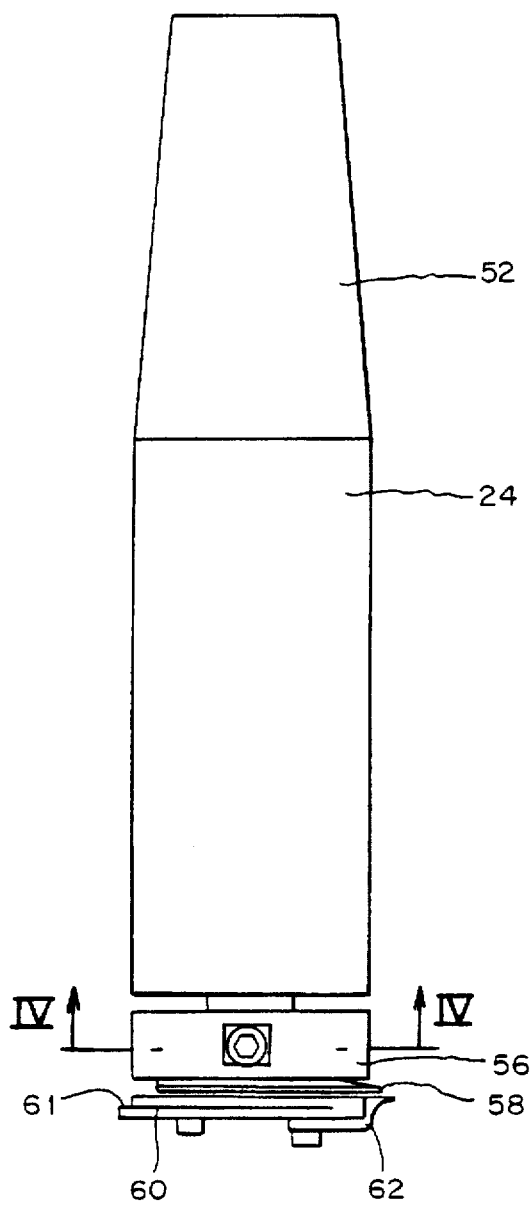
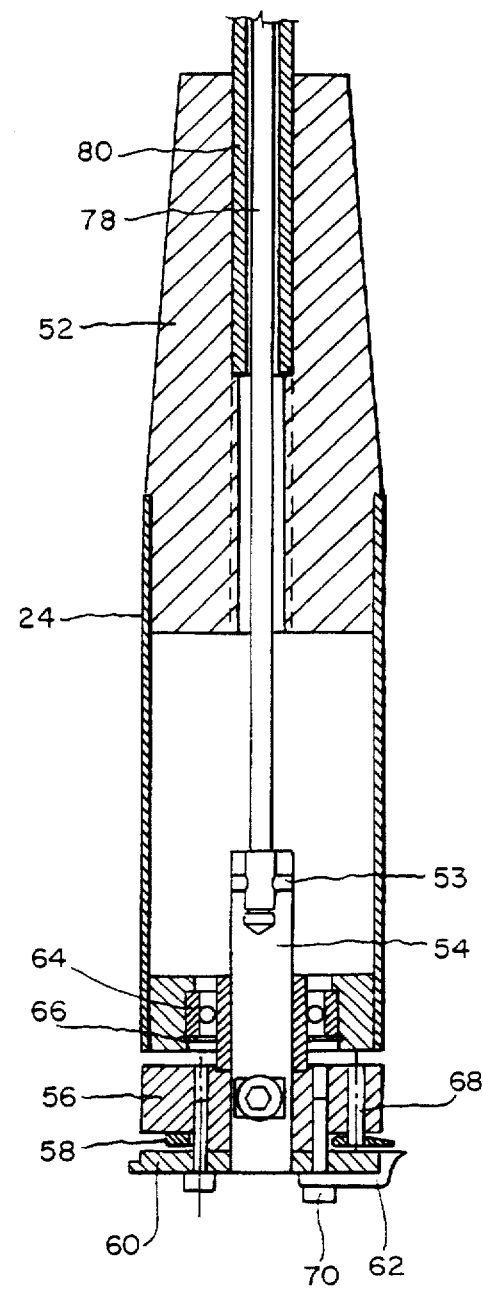

ADJUSTABLE TRAY DISPENSER

BACKGROUND OF THE INVENTION

1. Field of the Invention

The present invention relates to tray dispensing devices. More particularly, it relates to a tray dispensing device that has independently adjustable heads which enables the device to dispense plates, containers and trays of varying shapes and sizes.

2. The Prior Art

Trays of frozen foods, such as vegetables, sauces, meat dishes, baked goods, pastries, and almost every other variety of food which is susceptible to pre-cooking and freezing is now customarily packaged in shallow draft trays, having perimeter flanges or lips, which can be stacked and fed either singularly or in multiples onto a food conveyor where the trays are filled and sealed. Because trays are made from various materials, and are made in virtually unlimited numbers of shapes and sizes, including circular, rectangular, and all variations in between, there has been a long felt need for a tray dropper which is completely adjustable to accommodate any size or shape tray.

U.S. Pat. No. 4,441,630 to Sauer, discloses a rotary head tray dropper. The dispensing heads can be adjusted along the shaft by loosening cap screws so that the guides can be separated further part or brought closer together to adjust for trays of different length. One of the two gear boxes remains stationary, while the other can be moved along the same horizontal plane to accommodate foil trays of varying sizes.

The patent to Bouldin, U.S. Pat. No. 4,666,060, discloses a pot dispensing apparatus. The apparatus consists of a pair of pivotally connected arms that are arranged for movement toward and away from each other, along the same plane, and on opposite sides of a stack of pots to be dispensed. Each arm supports a plurality of feed cylinders, each having a spiral groove adapted to engage opposite sides of the pots. The feed cylinders are each rotated such that the spiral groove engages the pots are dispensed evenly.

Other devices that suffer from these or other drawbacks are U.S. Pat. Nos. 3,426,941, 3,071,292, 4,804,108, and 4,950,120.

SUMMARY OF THE INVENTION

The present invention provides a tray or foil dispensing device that has independently adjustable tray guides mounted on flexible drive shafts. The flexible drive shafts are coupled to a gear box that is driven by a variable speed motor. According the invention, the tray guides are adjustably connected to a lower support such that any one or more of said guides can be adjusted independently with respect to each other, the articles being dispensed, and the lower support. Each of the tray guides have a dispensing head for engaging the lips of the trays to be dropped. Each dispensing head has a timing adjustment to enable the user to synchronize the rotation of each dispensing head with respect to each other.

It is therefore an object of the present invention to provide an tray dispensing device that utilizes flexible drive shafts to drive the tray guides.

It is another object of the invention to provide a tray dispensing device with tray guides that are independently adjustable with respect to each other and the articles being dispensed.

It is yet another object of the invention to provide a tray dispensing device that has rotatable dispensing heads that are easily synchronized with each other.

A further object of the invention is to provide a tray dispensing device with timing adjustment means coupled to the dispensing heads.

Another object of the invention is to provide an adjustable tray dispensing device that operates efficiently and reliably.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 3a is a side elevational view of a tray guide in accordance with the invention;

FIG. 3b is a cross-sectional view of the tray guide of FIG. 3a taken along its central axis;

DETAILED DESCRIPTION OF PREFERRED EMBODIMENTS

Figure 1:
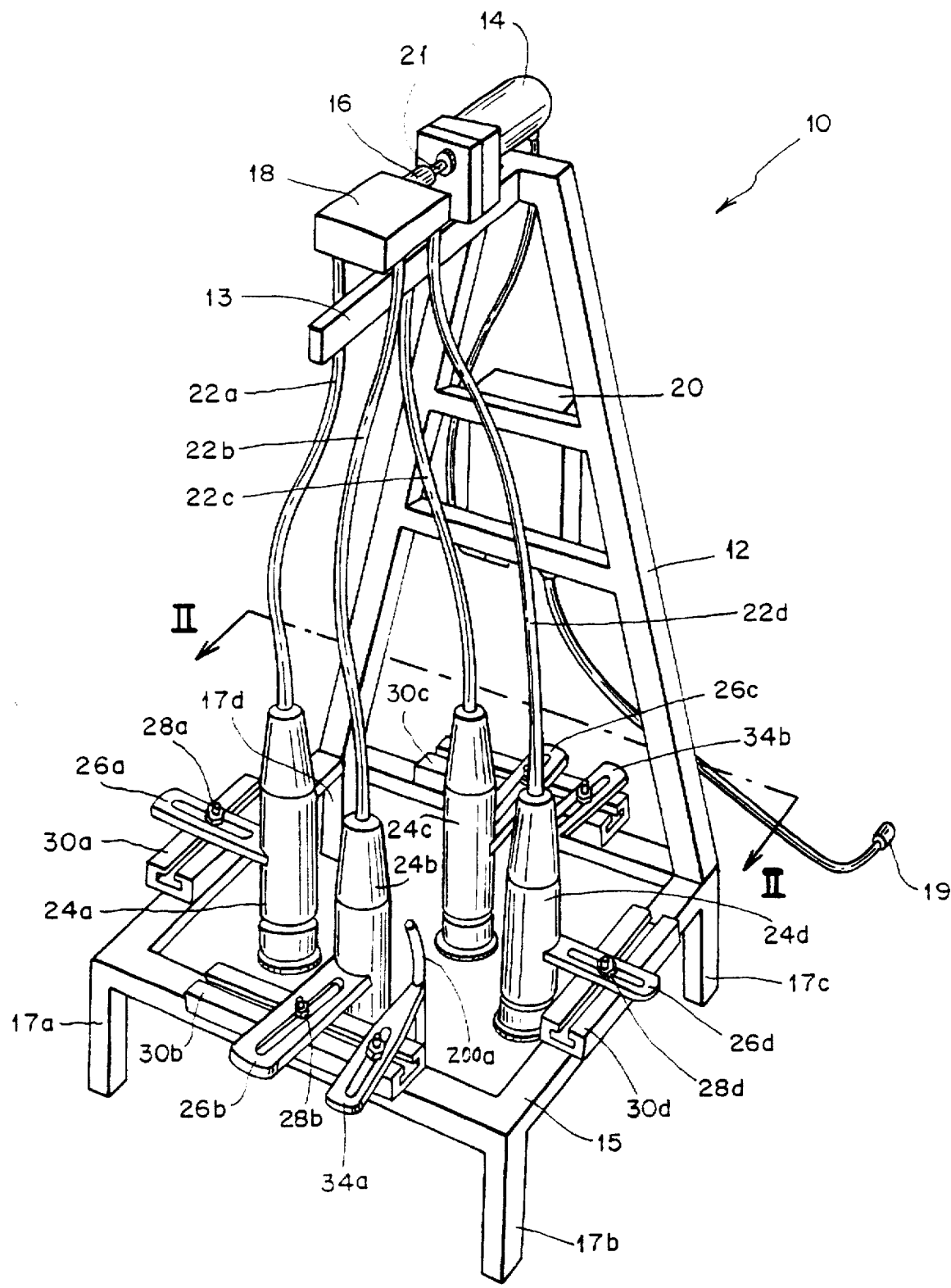
FIG. 1 is a perspective view of the adjustable tray dispensing device according to the invention.

Turning now in detail to the drawings, FIG. 1 shows the foil or tray dispenser 10 according to the invention. Dispenser 10 consists of a frame structure 12 having an upper support member 13, and a base or lower support 15. The lower support 15 is raised from the ground by legs 17a–d to provide the necessary clearance for dropping trays. Legs 17a–17d can be of any suitable known height for any type of application. In an alternative embodiment (not shown), the legs 17a–d can be eliminated, and the entire frame structure 12 can be suspended from the ground by any suitable known means.

The upper support member 13 and lower support 15, of frame 12, extend substantially perpendicular from said frame such that support member 13 and lower support 15 are disposed opposite to each other in a spaced relation. Upper support member 13 supports a variable speed DC motor 14 and a gear box 18. Drive shaft 21 of motor 14 is coupled to gear box 18 by means of a coupling device 16. Motor 14 receives its power from a DC control power supply 20 mounted on the outside of frame support 12. DC Control power supply 20 is connected to an external AC power source via plug 19, and provides variable DC power to motor 14.

Tray dispenser 10 is generally disposed over a conveyor such that trays are dispensed onto the conveyor for further processing. Motor 14 adjustably controls the rotational motion of the dispensing heads 54 of trays guides 24 (FIGS.

3a–4b), such that the trays are dropped onto the conveyor at a rate commensurate with the speed of the conveyor.

The lower support 15 supports a plurality of tray guides 24a–24d for receiving and dispensing trays. Although shown with four (4) tray guides, the number of guides can be changed according to specific applications. Tray guides 24a 24d are adjustably secured to base support 15 by means of slotted arm supports 26a–26d, respectively. Slotted arm supports 26a–26d are securely fastened at one end to tray guides 24a–24d, respectively, and include a longitudinal slot 27a–27d (FIG. 2) for slidably adjusting the position of said tray guides.

Figure 6:
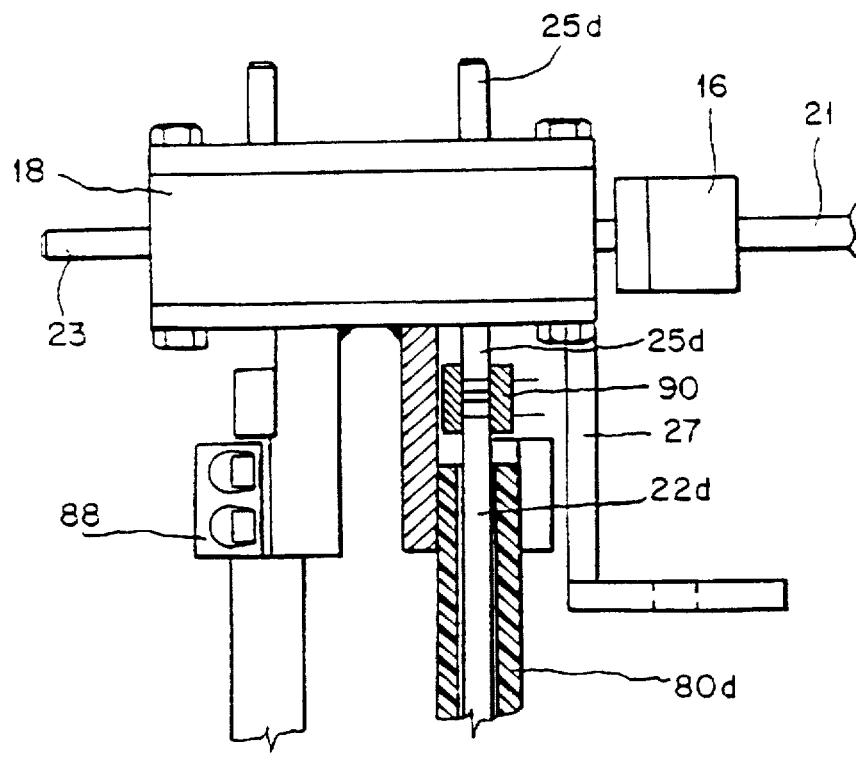
FIG. 6 is a partial cross sectional view of the drive shaft and gear box connection according to the invention.

The tray guides 24a–24d are coupled to gear box 18 by flexible drive shafts 20a–22d, respectively. Flexible drive shafts 20a–22d enable each tray guide 24a–24d, respectively, to be adjusted independent of each other. By enabling the independent adjustment of each tray guide, tray dispenser 10 can more easily accommodate any size or shape tray for dispensing. Flexible drive shafts 20a–22d are protected by an outer housing or sheath 80a–80d, respectively (FIG. 6). Outer housings 80a–80d not only protect the rotating drive shafts 20a–22d, respectively, but they provide a safer work environment by enabling the user to physically handle said drive shafts without danger of being injured.

Figure 2:
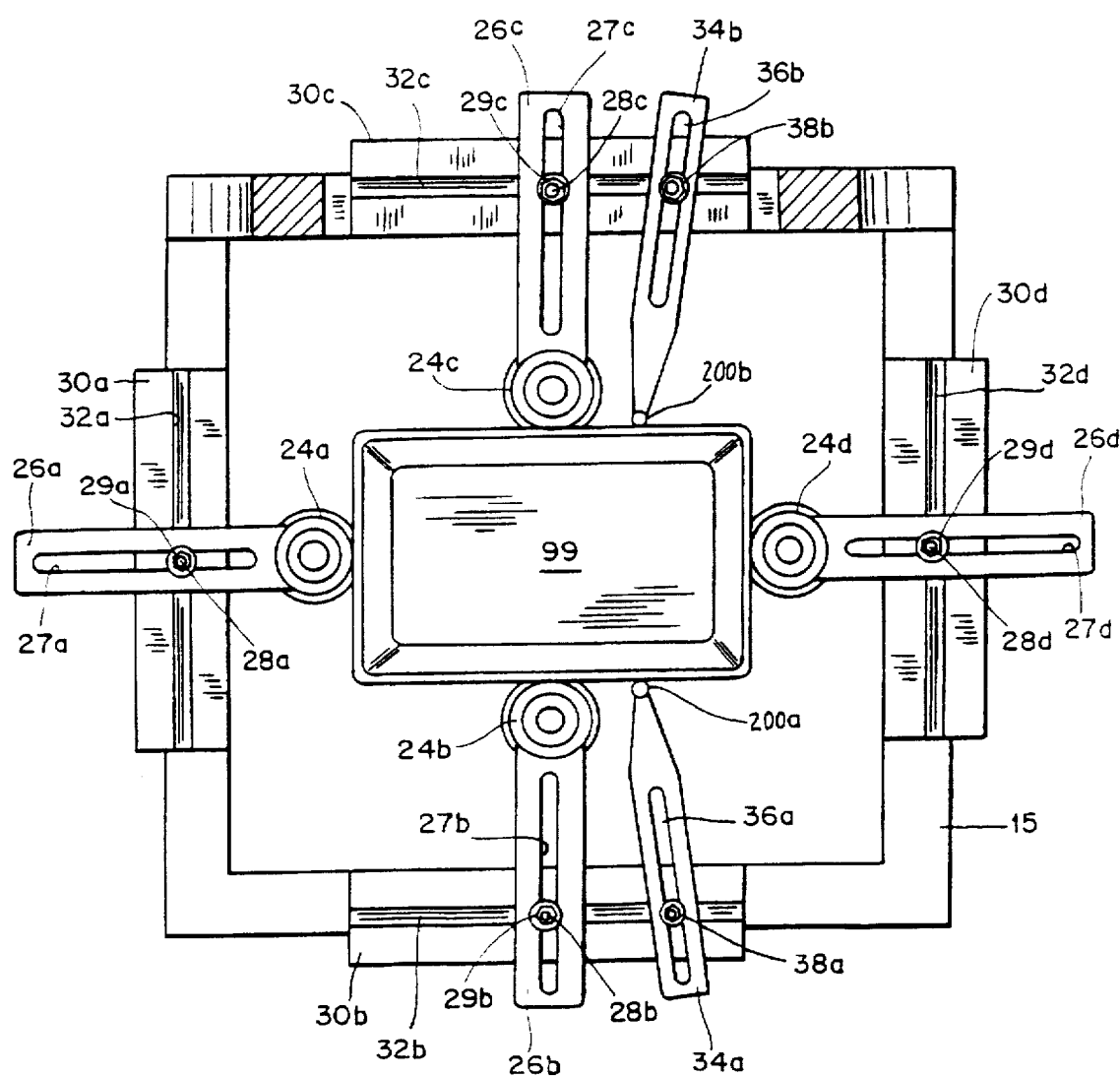
FIG. 2 is a cross-sectional view of the tray dispensing device taken along line II—II of FIG. 1.

FIG. 2 shows a cross sectional view of the tray dispenser of FIG. 1 which more clearly depicts the adjustable configuration of tray guides 24a–24d. Each tray guide 24a–24d is securely coupled to a slotted arm support 26a–26d, respectively. The slotted arm supports 26a–26d each have a slot 27a–27d, respectively, that receives a support securing screw 28a–28d, respectively. The support securing screw 28a–28d is disposed within a slot 30a–32d contained in tray guide support 30a–30d, respectively. Tray guide supports 30a–30d are all disposed on the same plane such that they are all level with respect to each other, and thereby enables each tray guide 24a–24d to be positioned at the exact same planar level with respect to each other. This configuration prevents uneven tray dispensing.

When adjusting any or all of the tray guides 24a–24d, the respective support securing screw 28a–28d is loosened and thereby allows the movement of slotted arm supports 26 in the direction of slots 32 and 27. Upon tightening of screws 28a–28d, the respective slotted arm supports 26a–26d are secured into a fixed position against the respective tray guide support 30a–30d. The securing of slotted arm supports 26a–26d secures the respective tray guide 24a–24d into the desired dispensing position. In another embodiment, securing screws 28a–28d include securing nuts 29a–29d, respectively, which are tightened or loosened during the adjustment of tray guides 24a–24d. Nuts 29a–29d can be butterfly type or any other suitable known type.

Flexible drive shafts 20a–22d have a length that is several times the length of tray guides 24a–24d, respectively. The length of flexible drive shafts 20a–22d is a factor in the adjusting the positions of tray guides 24a–24d. According to the preferred embodiment of the invention, flexible drive shafts 24a–24d are elongated to assure complete adjustability of tray guides 24a–24d within slotted arm supports 26a–26d and tray guide supports 30a–30d, respectively.

Each tray guide 24a–24d is therefore completely adjustable within the same plane, and can be independently adjusted with respect to each other, the lower support member 15, and tray stock: 99. During changeover from one type of tray stock to another, the independent adjustability of tray guides 24a–24d will facilitate these changeovers, and significantly decrease the down time of tray dispenser 10.

Tray dispenser 10 includes foil stock supports 200a and 200b which aid in maintaining the position of the trays being dispensed. Stock supports 200a and 42b are mounted on tray support brackets 34a and 34b, respectively. Tray stock support brackets 34a and 34b are shown as being adjustably secured to tray guide supports 30b and 30c, respectively, by means of a securing screw 38a and 38b, respectively. Tray stock supports 200a and 200b can alternatively be disposed in any of the tray guide supports 30a–30d depending on the desired application. In addition, the number of tray supports can also be varied, either more or less, and need not be limited to the two shown.

Securing screws 38a–and 38b pass through slots 36a and 36b, in supports 34a and 34b, respectively. With this configuration, tray stock supports 200a and 200b can be independently adjusted with respect to each other and the trays 99 being dispensed. Tray supports 200a and 200b have a length that is at least equal to the overall length of each of the tray guides 24a–24d.

FIGS. 3a, 3b, 4a and 4b show a detailed schematic of the tray guides 24 according to the invention. Tray guides 24 have an upper tapered cone portion 52 which guides the tray stock between the tray guides 24. Tray guides 24 can also be referred to as head bearing housings, and it should be understood that either term applies to the same structure. Tray guide 24 is internally connected to flexible drive shaft 78 by set screws 53. Set screws 53 couple drive shaft 78 to the head shaft 54. A bearing 64 and retaining ring 66 are mounted around head shaft 54, and stabilize said head shaft during the rotational movement thereof.

Figure 4A:
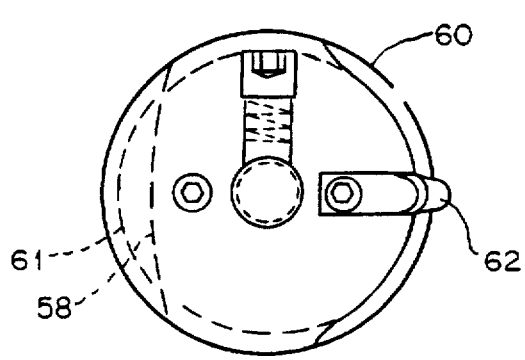
FIG. 4a is a bottom elevational view of the tray guide according to the invention.
Figure 4B:
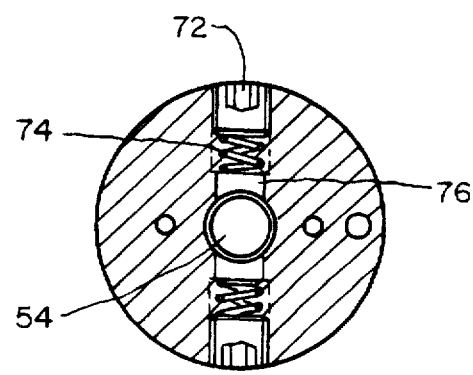
FIG. 4b is a cross-sectional view of the tray guide of FIG. 3a taken along line IV—IV.

Referring to FIG. 4b, dispensing head 56 includes a timing adjustment mechanism for enabling the synchronization of each of the dispensing heads 56 before inserting a tray stock for dispensing. By tightening or loosening set screw 72, more or less tension is created against friction plug 76 via spring 74. Friction plug 76 is pushed against shaft 54 and thereby provides the necessary friction to enable the rotation of drive shaft 54 to rotate dispensing head 56. With this configuration, dispensing head can be manually rotated by hand such that the tray pusher 62 is directed toward the center of the tray stock. Upon repeated use of the dispensing head, there is a possibility that friction plug 76 may wear, and not provide the requisite frictional contact with shaft 54. To remedy this occurrence, set screw 72 can be slightly tightened to increase the force of spring 74 against friction plug 76. Adjustment of the timing using this frictional engagement enables the synchronization of the dispensing heads with respect to each other without the use of tools. The timing adjustment of the dispensing heads is made when the tray dispenser is empty.

Figure 7:
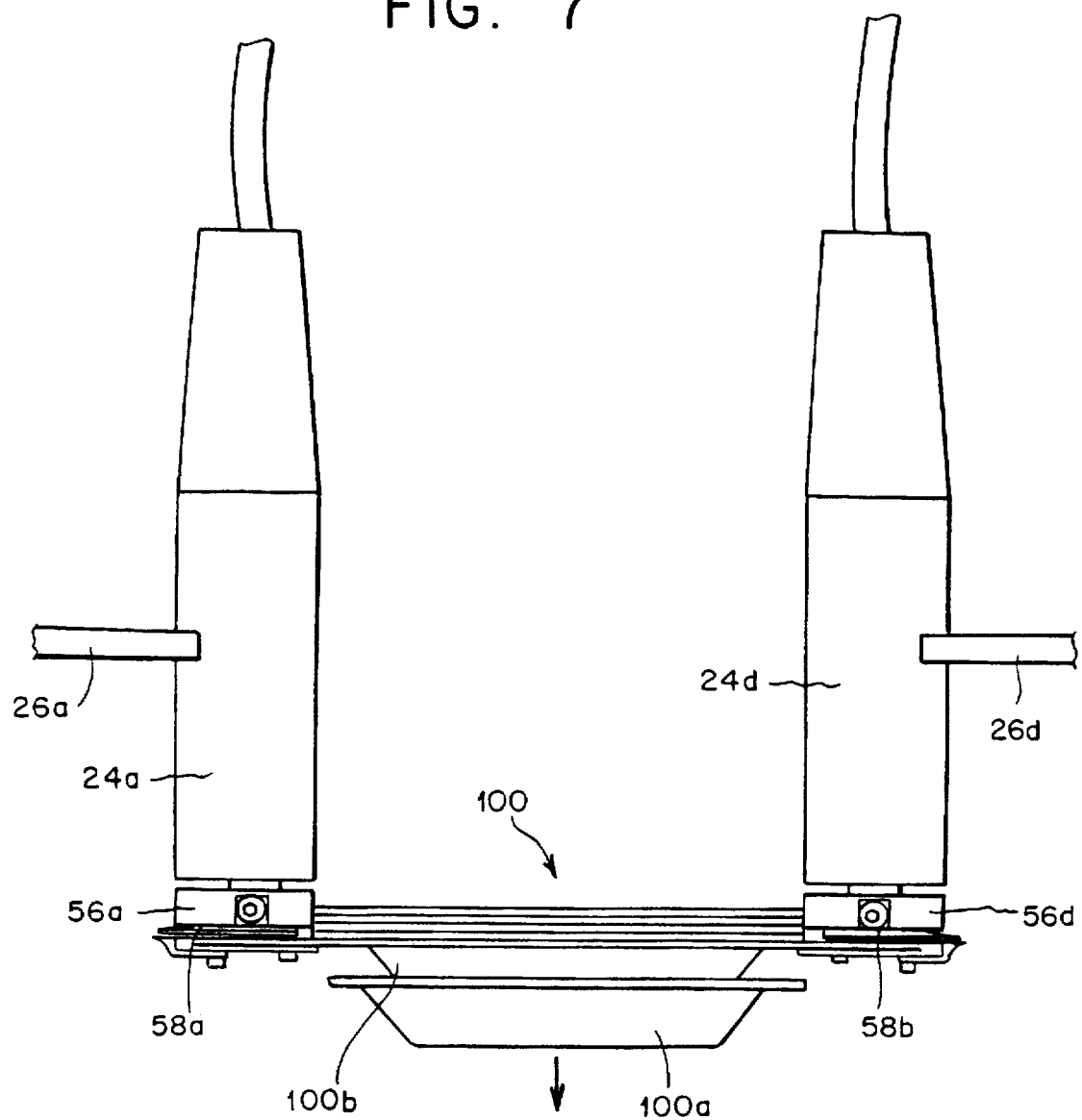
FIG. 7 is an elevational view of two tray guides of the tray dispenser with a tray or foil stock according to the invention.

Dispensing head 56 separates and dispenses the trays individually from the tray stock. Referring to FIGS. 3a, 3b and 7, dispensing head 56 includes a cut off blade 58, a bottom plate 60 and a tray pusher 62. When flexible shaft 78 starts to rotate, dispensing head rotates until cut off blade 58 positions itself into the center of the tray stock. By using the lips of the trays, plate s or containers, t he rotational motion of cut off blade 58 physically separates the lower most tray in the stock from the others. Further rotation of dispensing head 56 causes the tray 100b to fall onto lip 61 on bottom plate 60. At this stage, tray 100a will free fall from the tray stock 100, and tray 100b is next to be dropped. As dispensing head 56 rotate s an d cut off blade 58 is separating tray 100c from the stock, tray pusher 62 pushes the previously separated tray 100b further downward and assures complete dropoff into a free fall state. Upon successive rotations of dispensing head 56, each tray 100a, 100b, 100c, etc., from tray stock 100, will be individually dispensed in a synchronized and even manner.

Dispensing heads 56a and 56c rotate in the same direction with respect to each other, and in the opposite direction of dispensing heads 56d and 56b, respectively. Dispensing heads 56d and 56b rotate in the same direction with respect to each other. The opposite rotational motion of dispensing heads 56a and 56c with respect to 56d and 56b, helps to stabilize the tray stock when being dispensed. Therefore, it is preferable that the tray guides disposed opposite each other with respect to the tray stock have dispensing heads that rotate in opposite directions to further stabilize said tray stock.

Dispensing heads 56a–56d can be replaced with any other suitable dispensing head. The patent to Hovekamp, U.S. Pat. No. 3,426,941 discloses alternative dispensing head designs in FIGS. 6–10, which are hereby incorporated by reference.

Figure 5:
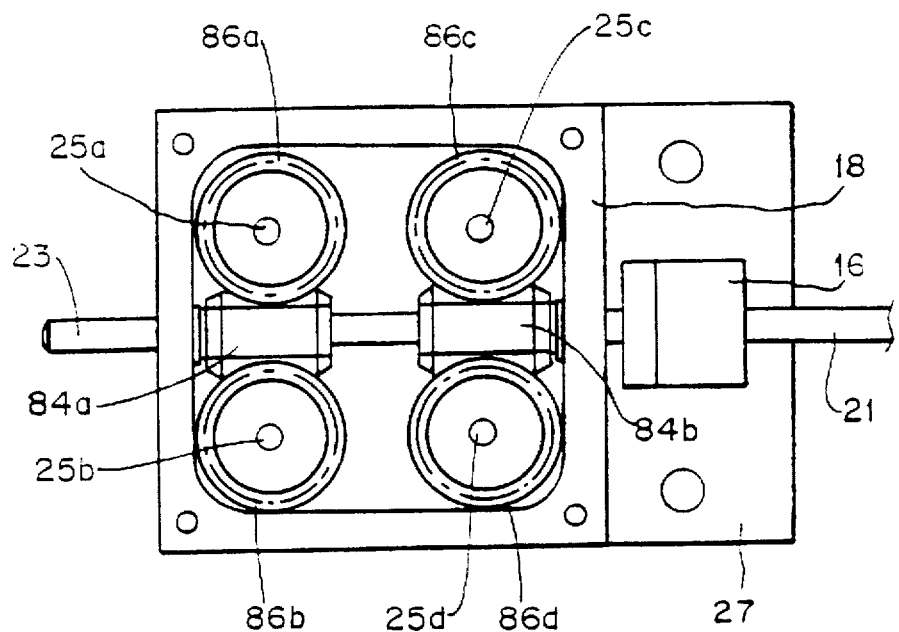
FIG. 5 is a partial schematic view of the gear box according to the invention.

FIG. 5 shows a broken away view of the gear box 18 according to the invention. Gear box 18 is mounted to the upper support member 13 by means of a mounting bracket 27, however, due to the flexibility of drive shafts 20a–22d, gear box 18 can be mounted in any orientation that enables the operation of said flexible drive shafts. Drive shaft 21, from motor 14, is coupled to gear box drive shaft 23 by means of coupler 16. Gear Box drive shaft 23 includes two worm gears 84a and 84b which engage worms 86a–86d. When drive shaft 23 rotates, worm gear 84a drives worms 86a and 86b, while worm gear 84b drives worms 86c and 86d.

In order to assure synchronized rotation of worms 86a–86d, the worm gears 84a and 84b must have the same pitch. In addition, each of the worms 86a–86d must also have the same exact pitch with respect to each other and worm gears 84a and 84b. Worms 86a–86d can also be referred to as tray guide drivers 86a–86d.

Worms 86a–86d are coupled with worm drive shafts 25a–25d, respectively, which extend through the bottom of gear box 18 and are coupled to flexible drive shafts 20a–22d, respectively. FIG. 6 shows an example of the coupling of worm drive shaft 25d with flexible drive shaft 22d. As shown, a coupler 90 is used to connect drive shaft 25d with the flexible drive shaft 22d. A clamp 88 is then secured around coupler 90 and the upper portion of the flexible drive shaft housing 80d. Flexible drive shaft 22d extends slightly beyond its housing 80d to facilitate connection to worm drive shaft 25d. Any other suitable known means for securing the flexible drive shafts 22 to the worm drive shafts 25 may also be used without departing from the scope of the invention.

It is very important that flexible drive shafts 22 do not have any freedom of motion (i.e., play) in the coupling of said shafts to worm drive shafts 25, via coupler 90, and to tray guides 24, via set screws 53 and shaft 54. In addition, there should be no freedom of motion or play between the ends of said flexible shaft. The elimination of free motion or play will enable the synchronized rotation of dispensing heads 54, and prevent the asynchronization thereof during operation of tray dispenser 10.

Worms 86a and 86c are disposed on one side of worm gears 84a and 84b, while worms 86b and 86d are disposed on the opposite side of worm gears 84a–84b within gear box 18. By disposing worms on opposite sides of worm gears 84a and 84b, gears 86a and 86c will rotate in the opposite direction as gears 86b and 86d. Thus, the pitch of the worms 86a–86d and worm gears 84a and 84b are very important for proper operation of the tray dispenser.

In an alternative embodiment of the invention (not shown), worms 86a–86d can be all disposed on the same side of gear box drive shaft 23, and additional worm gear could be added to accommodate this configuration. Accordingly, all worms 86a–86d would rotate in the same direction.

While one embodiment of the present invention have been shown and described, it is to be understood that many changes and modifications may be made thereunto without departing from the spirit and scope of the invention as defined in the appended claims.

What is claimed is:

1. An adjustable tray dispenser for singularly dispensing trays from a tray stock, and including a frame structure having an upper support member and a lower support member opposite said upper support member, the tray dispenser comprising:

drive means coupled to the upper support member for driving the tray dispenser;

a plurality of flexible drive shafts each having a first end connected to said drive means and a second opposite end;

a plurality of tray guides having an upper portion coupled to said second end of said flexible drive shafts, an intermediate portion adjustably coupled to the lower support member, and a lower portion having a dispensing head for dispensing trays, said plurality of tray guides receiving a tray stock for dispensing; and adjustment means coupled to each of said plurality of tray guides for allowing independent adjustment of each of said plurality of tray guides with respect to each other, the lower support member, and the tray stock.

2. The tray dispenser according to claim 1, wherein said drive means comprises:

a motor having a drive shaft extending therefrom;

coupling means having a first end coupled to said motor drive shaft and a second end; and a gear box having a drive shaft coupled to said second end of said coupling means and a plurality of drivers for coupling to said first end of said flexible drive shafts.

3. The tray dispenser according to claim 2, further comprising control means mounted on the frame structure and coupled to said motor for controlling the power output to said motor, said control means being coupled to an AC power supply.

4. The tray dispenser according to claim 1, wherein said plurality of tray guides further comprise timing adjustment means coupled to each of said dispensing heads for synchronizing each of said dispensing heads with respect to each other.

5. The system according to claim 1, wherein said adjustment means comprises:

an arm support having a first end coupled to the intermediate portion of each of said tray guides and a second free end, said arm support having a longitudinal slot extending from said first end to said second free end;

a tray guide support mounted on the lower support member, said tray guide support having a longitudinal slot disposed along its length;

a securing screw disposed in said longitudinal slot in said tray guide support, said securing screw passing through said longitudinal slot in said arm support; and said securing screw releasably secures said arm support to said tray guide support when said tray guide is in a desired position.

6. The tray dispenser according to claim 5, wherein said securing screw includes a securing nut for maintaining said securing screw in place.

7. The tray dispenser according to claim 2, wherein said motor is a variable speed motor.

8. The tray dispenser according to claim 1, further comprising:

at least one tray stock support adjustably mounted on the lower support member for further guiding the tray stock between said plurality of tray guides; and adjustment means coupled to said at least one tray stock support for enabling independent adjustment of said at least one tray stock support with respect to each of said plurality of tray guides, the lower support member, and the tray stock.

* * * * *